US009161659B2

(12) United States Patent
Lambert et al.

(10) Patent No.: US 9,161,659 B2
(45) Date of Patent: Oct. 20, 2015

(54) FILTERING SYSTEMS AND METHODS FOR FRYER APPARATUS

(75) Inventors: Keith Lambert, Lebanon, OH (US); Gary L. Mercer, Eaton, OH (US); Tim A. Landwehr, West Alexandria, OH (US)

(73) Assignee: Henny Penny Corporation, Eaton, OH (US)

(*) Notice: Subject to any disclaimer, the term of this patent is extended or adjusted under 35 U.S.C. 154(b) by 795 days.

(21) Appl. No.: 13/278,971

(22) Filed: Oct. 21, 2011

(65) Prior Publication Data
US 2013/0098847 A1 Apr. 25, 2013

(51) Int. Cl.
A47J 37/12 (2006.01)
B01D 37/04 (2006.01)

(52) U.S. Cl.
CPC .................................. *A47J 37/1223* (2013.01)

(58) Field of Classification Search
CPC .... B01D 35/00; B01D 35/18; B01D 35/0273; B01D 29/009; B01D 29/605; B01D 37/045; B01D 37/04; A47J 37/1223; A47J 37/1266; A47J 37/1285; A47J 37/12
USPC .......... 210/167.28, 416.5, 744, 97, 110, 111, 210/143; 99/403, 407, 408, 446, 330
See application file for complete search history.

(56) References Cited

U.S. PATENT DOCUMENTS

| 5,398,597 | A | | 3/1995 | Jones et al. |
| 5,731,024 | A | * | 3/1998 | Bivens ........................... 426/417 |
| 5,776,530 | A | * | 7/1998 | Davis et al. .................... 426/233 |
| 5,927,142 | A | | 7/1999 | Mercer |
| 5,942,269 | A | | 8/1999 | Casey et al. |
| 6,009,794 | A | | 1/2000 | Casey et al. |
| 6,057,772 | A | | 5/2000 | Burkett |
| 6,254,790 | B1 | | 7/2001 | King et al. |
| 7,322,278 | B2 | | 1/2008 | Mercer et al. |
| 2008/0121115 | A1 | | 5/2008 | Tiszai et al. |
| 2008/0121578 | A1 | * | 5/2008 | Burkett et al. ........... 210/167.28 |

* cited by examiner

*Primary Examiner* — Heidi Kelley
*Assistant Examiner* — Akash Varma
(74) *Attorney, Agent, or Firm* — Baker Botts L.L.P.

(57) ABSTRACT

A fryer apparatus includes a cooking chamber, at least one heating element in the cooking chamber, a filter pan that filters cooking medium from the cooking chamber, a drain valve that controls flow of cooking medium from the cooking chamber, and a filter pump that pumps filtered cooking medium from the filter pan to the cooking chamber. Inlet orifices are disposed in the cooking chamber, and selectively eject filtered cooking medium into the cooking chamber. A controller controls the drain valve to adjust the rate of flow from the cooking chamber, and selectively activates at least inlet orifice of the plurality of inlet orifices to eject filtered cooking medium into the cooking chamber. The controller is configured to control the drain valve and the selective activation of the at least one inlet orifice to maintain a substantially constant level of cooking medium in the cooking chamber throughout a filtering operation.

20 Claims, 14 Drawing Sheets

FILTERING SYSTEMS AND METHODS FOR FRYER APPARATUS

BACKGROUND OF THE INVENTION

1. Field of the Invention

The invention relates generally to fryer apparatus that use cooking media to cook product in a fryer, such as a pressure fryer or an open fryer, and that filter the cooking media while the cooking media remain in the fryer apparatus. The invention also is directed to methods for using such apparatus.

2. Description of Related Art

Known fryer apparatus are used to cook various food products, e.g., poultry, fish, potato products, and the like. Such fryer apparatus may include one or more cooking chambers, e.g., fryer pots, which may contain a cooking medium, e.g., an oil, a liquid shortening, or a meltable-solid or semi-solid shortening. Such fryer apparatus also include a heating element, i.e., an electrical heating element, such as a heating oil medium, or a gas heating element, such as a gas burner and gas conveying tubes, which heat the cooking medium in the cooking chamber. When preparing food in a fryer apparatus, the quality of the cooking medium, e.g., the oil or shortening, may impact the quality of the food that is cooked by the fryer apparatus. As the cooking medium is used to cook food, particles of food may contaminate the cooking medium. The flavor characteristics of each of these food products may become infused to a greater or a lesser degree in the cooking medium. This infusion may adversely affect food quality. Moreover, upon heating the cooking medium, the cooking medium may undergo chemical reactions, e.g., hydrolysis, oxidation, and polymerization.

These chemical reactions and flavor infusions may shorten the useful life of the cooking medium, and may result in more frequent replacement of cooking medium. As operators of fryer apparatus transition to using more expensive cooking media, i.e., zero-trans fat cooking media, frequently replacing an entire batch of cooking medium may become expensive. Thus, known fryer apparatus include filtering mechanisms to remove foreign objects, clumps, cracklings, and crumbs from the cooking medium, in order to preserve the useful life of the cooking medium. In known fryer apparatus, the cooking medium is drained from the cooking chamber into a filtration system, where the cooking medium is filtered. During this process, the fryer apparatus may not be used. Moreover, when the filtered cooking medium is returned to the cooking chamber, the cooking medium is reheated to a cooking temperature.

The longer the cooking medium is in the filtration system and out of the cooking chamber, the more time is required to reheat the cooking medium to an operating temperature. In a known filtration process, the time to reheat the cooking medium to an operational temperature may be greater than the time required to filter the cooking medium. Thus, draining the cooking medium from the filter may result in increased down time, i.e., time out of service for the fryer apparatus, which is not desirable, particularly in operations in which the fryer apparatus is expected to process a high volume of food products.

In addition, when filtering the cooking chamber, various foreign objects, e.g., food crumbs, clumps, and cracklings, may accumulate on the bottom of the chamber, and should be removed as part of the filtration process. Because these foreign elements may settle at the bottom of the chamber, they may not exit the cooking chamber with the cooking medium.

As mentioned above, in known fryer apparatus, filtration requires draining all or most of the cooking medium from the cooking chamber in order to perform filtration. In known fryer apparatus, this may be a time-consuming process, particularly when the filtration process also includes manually scrubbing the walls of the fryer apparatus by hand. Thus, when the fryer apparatus is used in a practical environment, filtration may not occur as often as is optimally desired, particularly when the fryer apparatus is used in a high-volume setting. Further, known fryer apparatus require the filtration process to be manually activated. Thus, during use in a practical environment, an operator may forget to perform filtration at the desired interval. This failure to perform filtration at optimal times may reduce the useable life of the cooking medium. Regardless of how often filtration is performed, however, the more filtration operations that are carried out, the longer each batch of cooking medium may maintain its usefulness. In known fryer apparatus, the useful life of the cooking medium is balanced against the utilization rate of the known fryer apparatus.

SUMMARY OF THE INVENTION

Therefore, a need has arisen for systems and methods for filtering cooking media used in a fryer apparatus that overcome these and other shortcomings of the related art. Specifically, the invention relates to the use of a constant level filtration system that filters the cooking medium while maintaining the amount of cooking medium in the fryer apparatus at a level suitable for normal operation, regardless of whether the fryer apparatus is in actual operation during filtration. A technical advantage of the invention is that the temperature of the cooking medium may be maintained at an elevated level because the cooking medium is not drained completely from the cooking chamber. This temperature maintenance may allow the down time for the fryer apparatus to be greatly reduced or completely eliminated. In addition, the amount of cooking medium remaining in the cooking chamber of the fryer apparatus may be sufficient to cover the heating element, allowing the heating element to remain activated during filtration, thus further reducing the amount of time required to re-heat the cooking medium to a cooking temperature after the filtration process.

Another technical advantage of the invention is that the fryer apparatus may cleanse the bottom and sides of the filter pan without manually scrubbing the bottom and sides of the filter pan, and without draining the cooking medium from the fryer apparatus. This allows both more consistent and thorough filtering of the cooking medium, and decreased downtime for the fryer apparatus.

In an embodiment of the invention, a fryer apparatus comprises a cooking chamber configured to store cooking medium therein and to cook food products therein; at least one heating element disposed in the cooking chamber and configured to transmit heat to cooking medium stored in the cooking chamber; a filter pan disposed below the cooking chamber, and configured to receive and filter cooking medium from the cooking chamber; a drain valve configured to control flow of cooking medium from the cooking chamber to the filter pan; a filter pump configured to pump filtered, cooking medium from the filter pan to the cooking chamber; a plurality of inlet orifices formed through the bottom of the filter pan, and configured to selectively eject filtered, cooking medium into the cooking chamber; and a controller. The controller may be configured to control the drain valve to adjust the rate of flow of the cooking medium from the cooking chamber, and to selectively activate at least one inlet orifice of the plurality of inlet orifices to eject filtered cooking medium into the cooking chamber. The controller may be configured to control the drain valve and the selective activation of the at least one inlet orifice to maintain a substantially constant level of cooking medium in the cooking chamber throughout an entire filtering operation.

In another embodiment of the invention, a method of filtering cooking medium contained in a cooking chamber having at least one heating element therein comprises the steps of: draining a predetermined amount of cooking medium from the cooking chamber, such that each of the at least one heating element is submerged in cooking medium throughout the filtering method; filtering the drained cooking medium; ejecting the filtered, drained cooking medium back to the cooking chamber through at least one orifice; further draining cooking medium from the cooking chamber while further ejecting filtered, drained cooking medium through the at least one orifice; and controlling a rate of further draining and a rate of further ejecting, such that a substantially constant level of cooking medium is maintained in the cooking chamber.

Other objects, features, and advantages of the present invention will be apparent to persons of ordinary skill in the art in view of the following detailed description of the invention and the accompanying drawings.

BRIEF DESCRIPTION OF THE DRAWINGS

For a more complete understanding of the invention, needs satisfied thereby, and the objects, features, and advantages thereof, reference now is made to the following description taken in connection with the accompanying drawings.

DETAILED DESCRIPTION OF EMBODIMENTS OF THE INVENTION

Preferred embodiments of the present invention, and their features and advantages, may be understood by referring to FIGS. 1-14, like numerals being used for corresponding parts in the various drawings.

Figure 1:
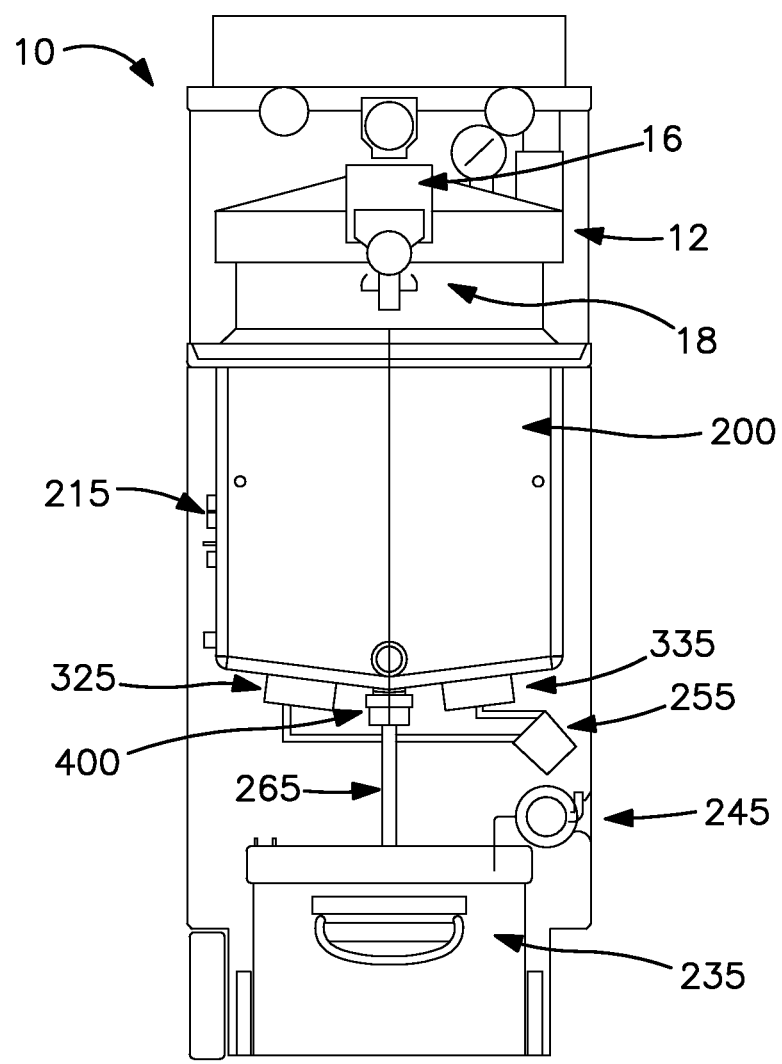
FIG. 1 is a front view of an exemplary fryer apparatus, including a frypot, with the protective cover and control panel removed, according to an embodiment of the invention.

FIG. 1 depicts an exemplary fryer apparatus, according to an embodiment of the invention. Although the fryer apparatus depicted in FIG. 1 is a pressure fryer having a lid, the filter pan described herein also may be used with open-well fryers without substantial modification. A pressure fryer is depicted here merely for exemplary purposes. In an embodiment of the invention, the front of the fryer apparatus depicted in FIG. 1 also may comprise a front cover panel or door, and a control panel, both of which have been removed from the fryer apparatus depicted in FIG. 1 for illustrative purposes. According to FIGS. 1 and 2, a fryer apparatus 10 may comprise a frypot 200, which is depicted separately and in more detail with respect to FIGS. 3-8. Frypot 200 may comprise at least one heating element 210. Heating element 210 may be disposed within frypot 200, and in an embodiment of the invention, may be disposed at a lower end of frypot 200. Further, in an embodiment of the invention, heating element 210 may extend across the area of frypot 200, in order to evenly heat the cooking medium contained therein.

Frypot 200 may be partially filled with cooking medium. Specifically, during operation, frypot 200 may contain an amount of cooking medium sufficient to cook food items. This amount is hereinafter referred to as a "cooking volume" of cooking medium. The cooking volume represents the range of amounts of cooking medium that are sufficient for operation. This amount varies depending upon the shape of frypot 200 and the application of fryer apparatus 10. In an embodiment of the invention, an interior wall of frypot 200 may be scored with one or more marks that indicate sufficient levels of cooking medium have been added to frypot 200, depending upon the temperature of the cooking medium. These marks are omitted from the drawings.

Fryer apparatus 10 also may have a fryer lid 12. Fryer lid 12 may include a release pin 16 and a lid latch 18. Lid latch 18 may secure fryer lid 12 to frypot 200. Fryer apparatus 10 may have a filter pan 235, which may be any filtering mechanism suitable for filtering cooking medium. Filter pan 235 may be removable from fryer apparatus 10, or filter pan 235 may be attached to fryer apparatus 10. Filter pan 235 may receive cooking medium from frypot 200 via drain valve assembly 400, which is described in more detail herein, and through drain pipe 265 which may connect frypot 200 to filter pan 235. In an embodiment of the invention, drain pipe 265 is attached to filter pan 235. Nevertheless, in another embodiment of the invention, drain pipe 265 is disposed over an opening in filter pan 235, but is not attached to filter pan 235.

Figure 2:
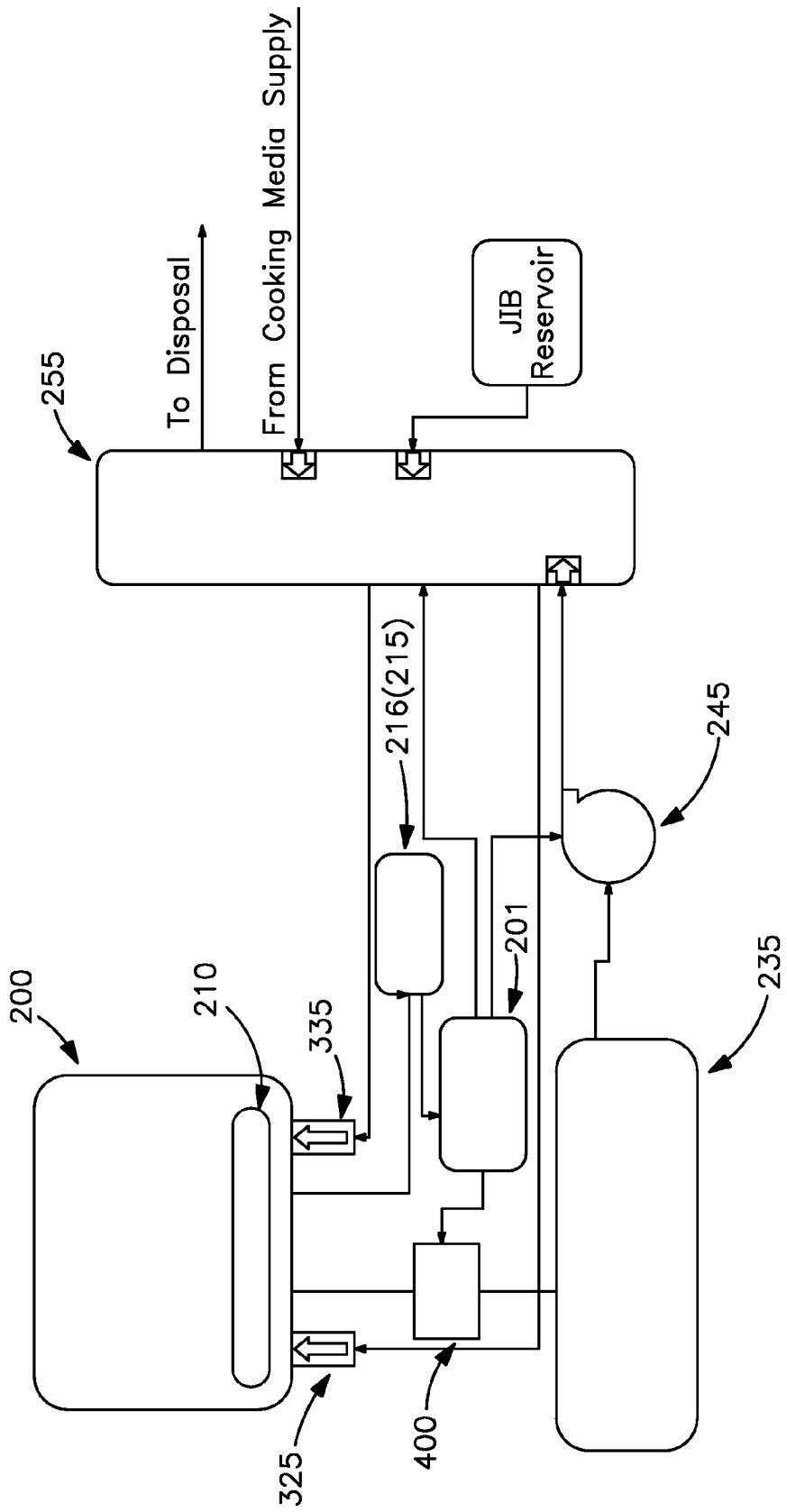
FIG. 2 is a block diagram of the portions of the fryer apparatus, according to an embodiment of the invention.

Filter pan 235 may be connected to a filter pump 245, which may draw cooking medium through a filter (not shown) in filter pan 235, and through tubing into a multiport valve 255. Multiport valve 255 may return the filtered cooking medium through inlet orifices, in a process that is described in more detail herein. Although other embodiments may have more or fewer inlet orifices, the embodiments depicted have two inlet orifices: a left-side, inlet orifice 325 and a right-side, inlet orifice 335. As depicted in FIG. 2, multiport valve 255 also may supply cooking medium from other reservoirs and also may serve to route cooking medium from filter pan 235 to a waste receptacle (not shown) for disposal.

Referring again to FIG. 2, fryer apparatus 10 may comprise a controller 201, not depicted in FIG. 1. Controller 201 may receive signals from, among other sensors, a level sensor 216. Level sensor 216 may be disposed at sensor setting bracket 215, as depicted in FIG. 1. In an embodiment of the invention, level sensor 216 may comprise one or more pressure transducers. In another embodiment of the invention, sensor setting bracket 215 may comprise two different types of pressure transducers, disposed at two different positions on sensor setting bracket 215. Other embodiments of the invention may use different types or numbers of cooking medium level sensors. For simplicity, however, level sensor 216 is used to refer collectively to the sensors that are disposed on sensor setting bracket 215 to determine an amount of cooking medium in frypot 200. Controller 201 receives and processes the signals from level sensor 216 and controls drain valve assembly 400 and multiport valve 255, in a process that is described in more detail herein. Controller 201 also may send and receive signals to and from a control panel (not shown), which may control input of commands to fryer apparatus 10 and may display output signals from fryer apparatus 10.

Figure 3:
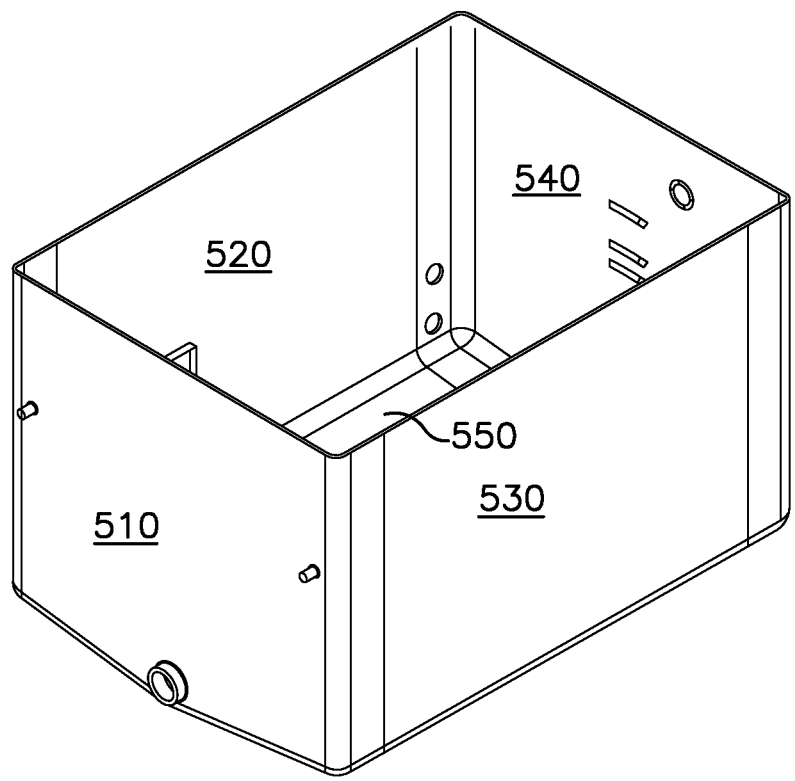
FIG. 3 is a perspective view of the frypot, according to an embodiment of the invention.
Figure 4:
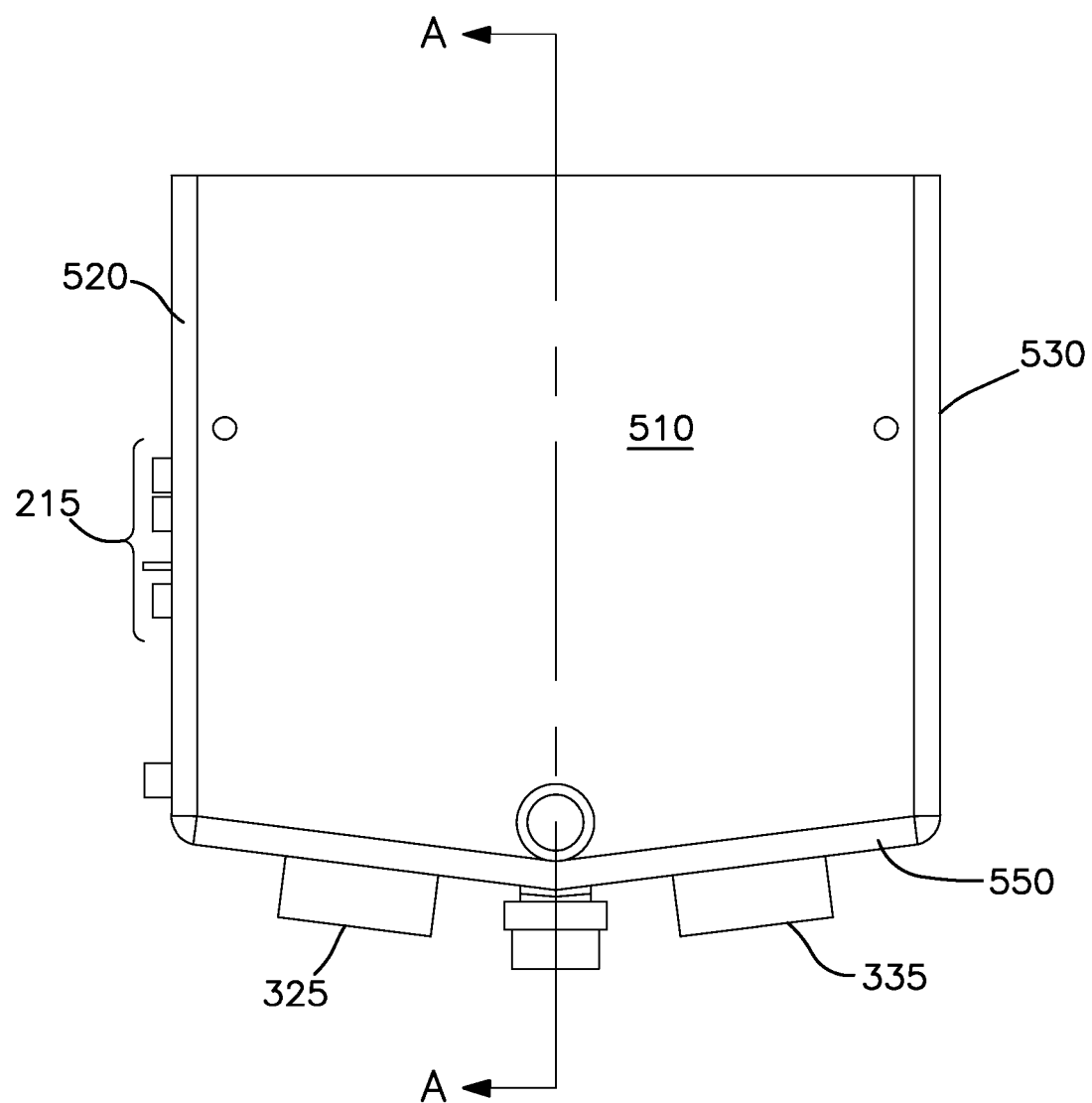
FIG. 4 is a front view of the frypot, according to an embodiment of the invention.

FIGS. 3-8 depict various views of frypot 200, separated from fryer apparatus 10 for ease of illustration. As depicted in FIG. 3, frypot 200 may have a front wall 510; left and right walls 520 and 530, respectively; rear wall 540; and bottom wall 550. Sensor setting bracket 215 may be affixed to left wall 520, as depicted in FIG. 4. Further, as depicted in FIG. 4, bottom wall 550 may slope downward toward a central, longitudinal center line. This design may facilitate removal of foreign material from bottom wall 550, in a process which will be described in more detail herein. Referring again to FIG. 4, inlet orifices 325 and 335 may be disposed on bottom wall 550. Right-side, inlet orifice 335 may be disposed on a right side of bottom wall 550, and left-side, inlet orifice 325 may be disposed on a left side of bottom wall 550. Moreover, in an embodiment of the invention, a distance between left wall 520 and left-side, inlet orifice 325 may be the same as a distance between right wall 530 and right-side, inlet orifice 335.

Figure 5:
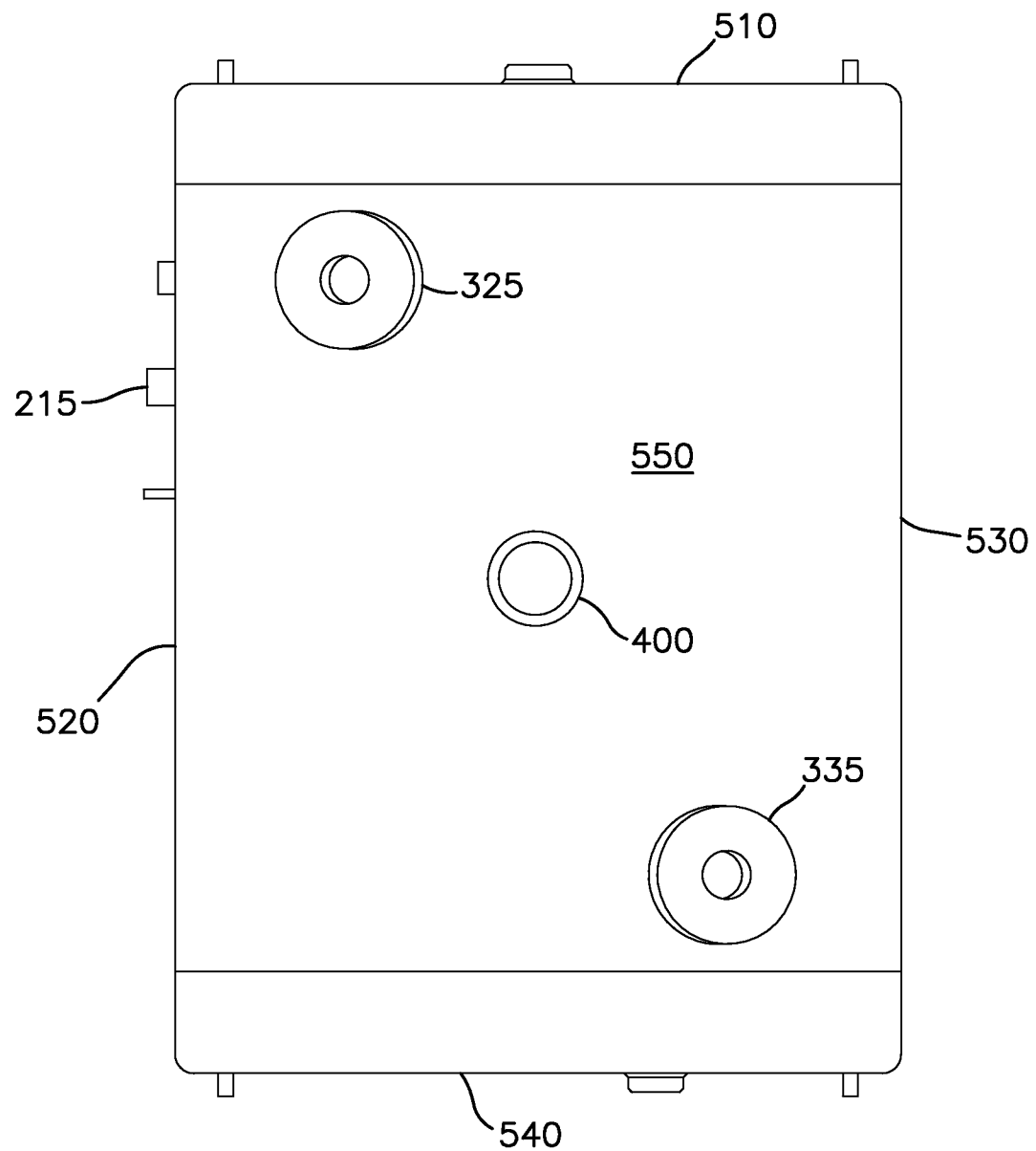
FIG. 5 is a bottom view of the frypot, according to an embodiment of the invention.
Figure 6:
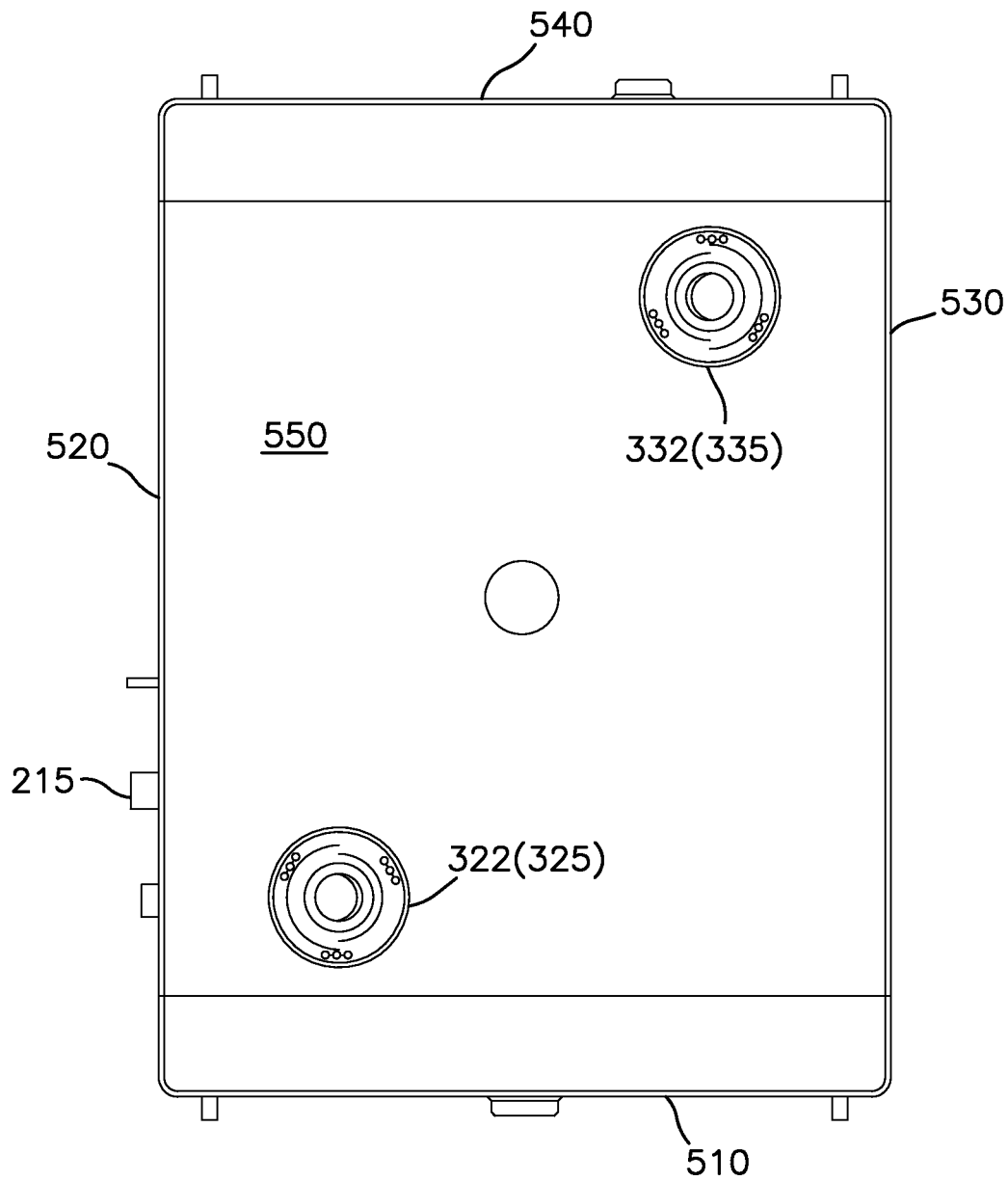
FIG. 6 is a top view of the frypot, according to an embodiment of the invention.

In addition, as depicted in FIGS. 5 and 6, left-side, inlet orifice 325 may be disposed closer to front wall 510 than to rear wall 540, and right-side, inlet orifice 335 may be disposed closer to rear wall 540 than to front wall 510. Additionally, in an embodiment of the invention, a distance between front wall 510 and left-side, inlet orifice 325 may be the same as a distance between rear wall 540 and right-side, inlet orifice 335. Thus, left-side, inlet orifice 325 and right-side, inlet orifice 335 may be disposed symmetrically about a diagonal line of symmetry of bottom wall 550. The position of left-side, inlet orifice 325 and right-side, inlet orifice 335 may be optimized to facilitate fluid flow through frypot 200, as is discussed in more detail herein.

Figure 7:
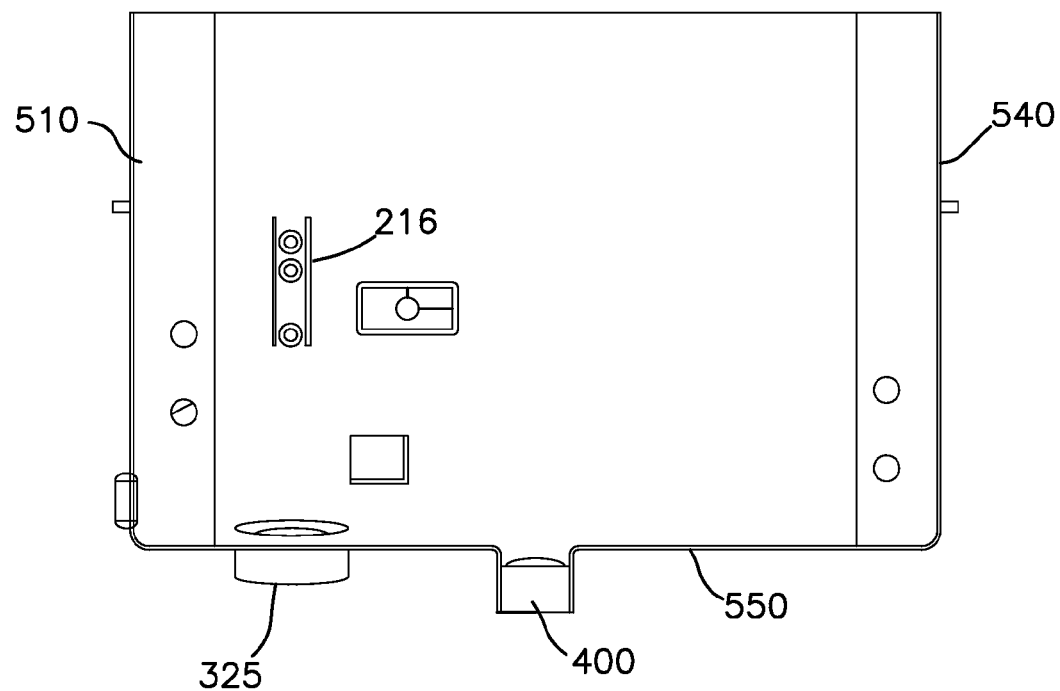
FIG. 7 is a cross-sectional view of the frypot depicted in FIG. 4, taken along line A-A.
Figure 8:
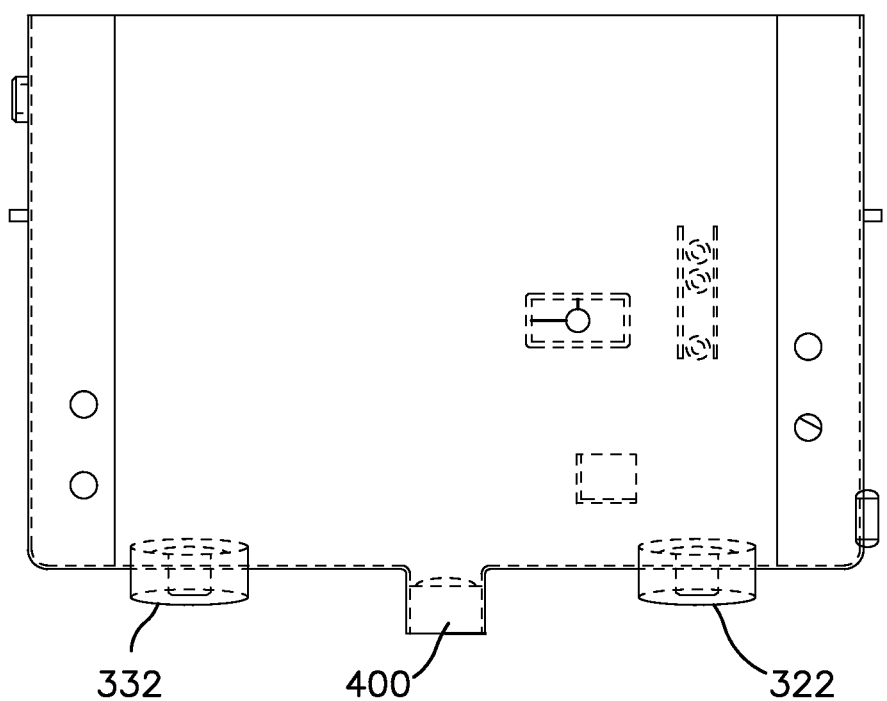
FIG. 8 is a side view of the frypot, according to an embodiment of the invention.

As depicted in FIG. 7, which depicts a cutaway side view of frypot 200, and FIG. 8, which depicts a cross-sectional view of frypot 200, left-side and right-side, inlet orifices 325 and 335 each extend into the chamber of frypot 200. In an embodiment of the invention, left-side and right-side, inlet orifices 325 and 335 each comprise an exterior inlet orifice portion 322 and 332, respectively, and an interior inlet orifice portion 327 and 337, respectively. The interior inlet orifice portions 327 and 337 are disposed within the chamber of frypot 200 and extend outward from bottom wall 550. In an embodiment of the invention, exterior inlet orifice portions 322 and 332 are formed integrally with frypot 200, and interior inlet orifice portions 327 and 337 are attached removably to the interior side of bottom wall 550 at exterior inlet orifice portions 322 and 332.

Figure 9:
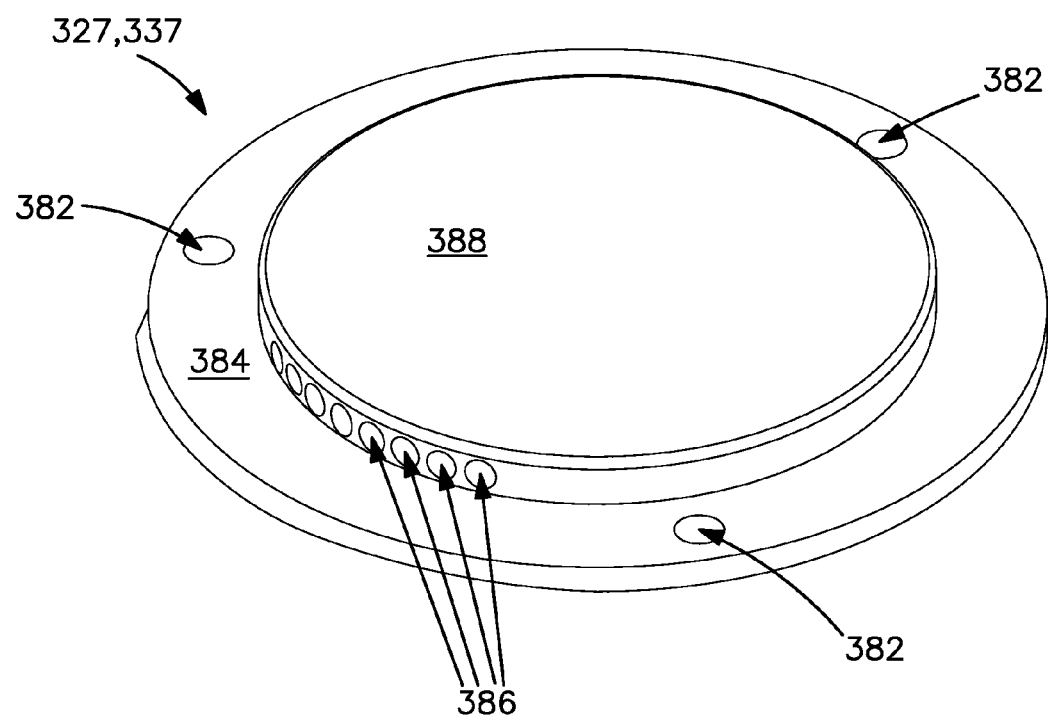
FIG. 9 is a perspective view of the interior inlet orifice portion, according to an embodiment of the invention.

The interior inlet orifice portions 327 and 337 now are described in more detail with respect to FIGS. 9-11. FIG. 9 depicts a perspective view of interior inlet orifice portions 327 and 337. FIG. 9 depicts interior inlet orifice portion 327, but, in an embodiment of the invention, interior inlet orifice portion 327 is the same as interior inlet orifice portion 337. In the following description, references made to interior inlet orifice portion 327 also may be understood to apply to interior inlet orifice portion 337, unless otherwise indicated. Interior inlet orifice portion 327 may comprise a base portion 384 and a cap portion 388 and may have a plurality of flow apertures 386 and bolt holes 382, which are described in more detail herein. Interior inlet orifice portion 327 may be constructed of stainless steel and, in particular, may be made of food-grade quality stainless steel.

As described above, interior inlet orifice portion 327 may be attached removably to the interior side of bottom wall 550 at exterior inlet orifice portion 322. Specifically, interior inlet orifice portion 327 may be attached to exterior inlet orifice portion 322 by bolts (not shown) inserted through bolt holes 382 in FIG. 9. This configuration is used to allow ease of access to interior inlet orifice portion 327 for cleaning and removal. In an embodiment of the invention, these bolts may be flat-head and configured to be threaded, so that the top of the bolt is flush with base portion 384 of interior inlet orifice portion 327. When interior inlet orifice portion 327 is attached to exterior inlet orifice portion 322, base 384 may be flush with bottom wall 550, in order to prevent buildup of foreign material around interior inlet orifice portion 327. In another embodiment of the invention, interior inlet orifice portion 327 may be permanently attached to, or integrally formed with, the interior side of bottom wall 550.

Figure 10A:
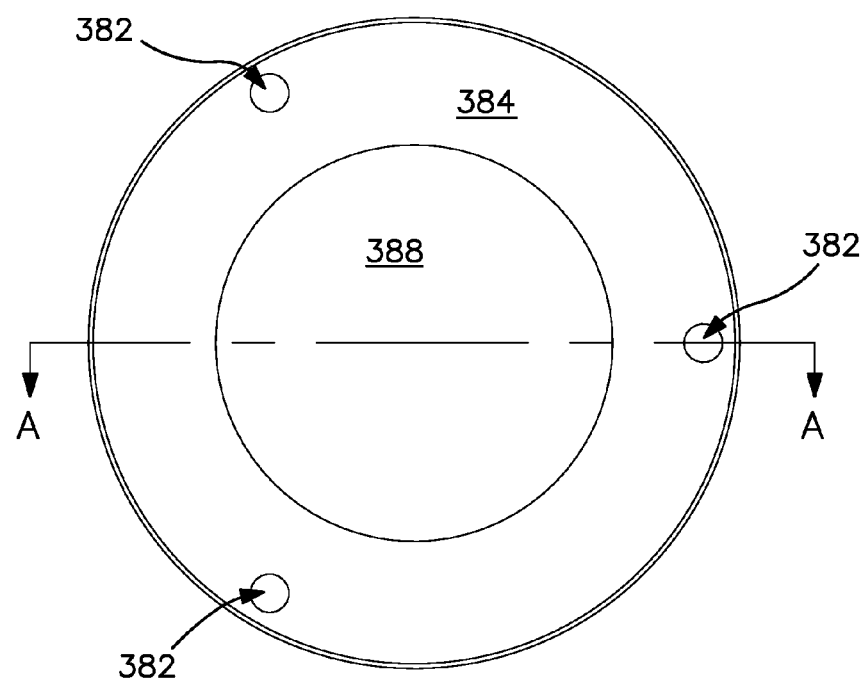
FIG. 10A is a top view of the interior inlet orifice portion, according to an embodiment of the invention.
Figure 10B:
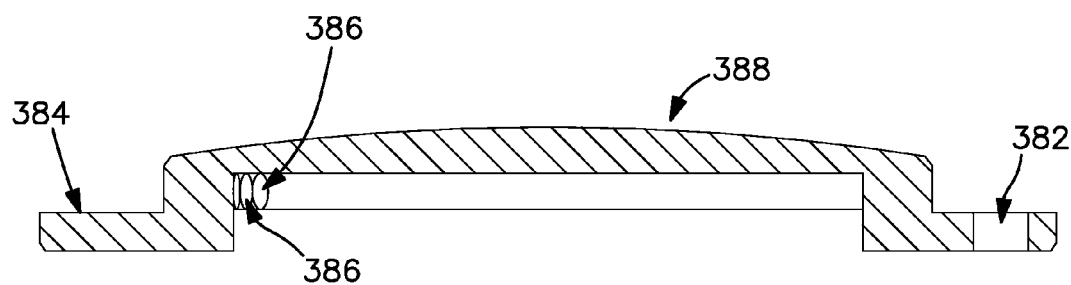
FIG. 10B is a cross-sectional view of the interior inlet orifice portion, depicted in FIG. 11A, taken along line A-A.
Figure 11A:
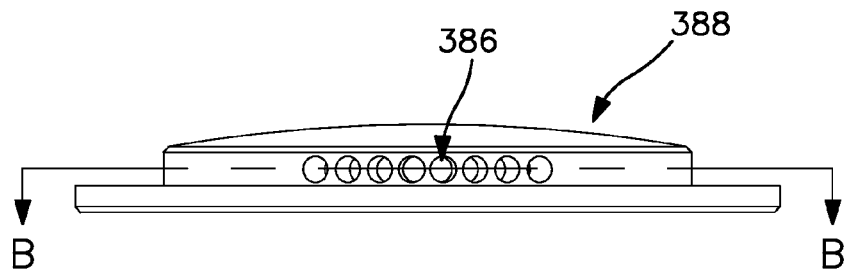
FIG. 11A is a side view of the interior inlet orifice portion, according to an embodiment of the invention.
Figure 11B:
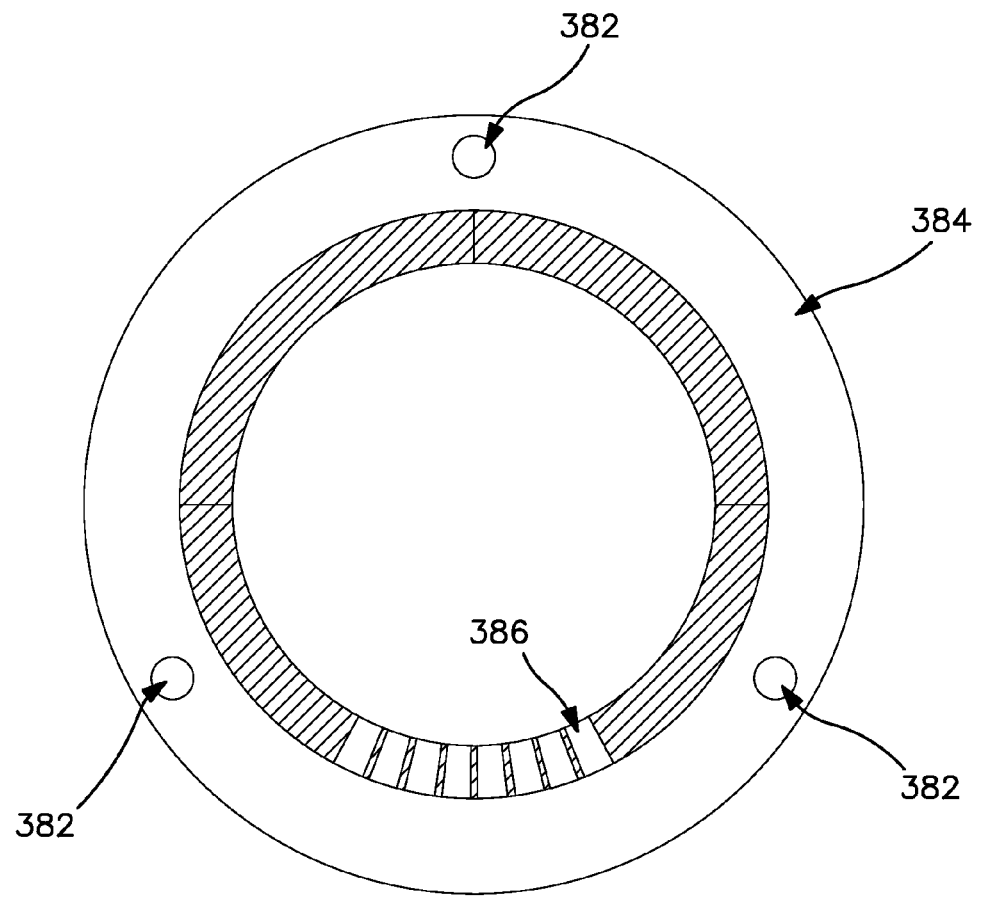
FIG. 11B is a cross-sectional view of the interior inlet orifice portion, depicted in FIG. 11A, taken along line B-B.

FIG. 10A is a top view of interior inlet orifice portion 327. FIG. 10B is a cross-sectional view of interior inlet orifice portion 327 depicted in FIG. 10A, taken along line A-A. Similarly, FIG. 11A is a side view of interior inlet orifice portion 327, and FIG. 11B is a cross-sectional view of interior inlet orifice portion 327 depicted in FIG. 11A, taken along line B-B. As depicted in FIGS. 10A and 10B, cap portion 388 covers a hollow portion of interior inlet orifice portion 327, through which filtered cooking medium may flow. Specifically, filtered cooking medium may flow through the hollow portion of interior inlet orifice portion 327 and may be jetted through flow apertures 386 by filter pump 245 (see FIG. 1), in a process that is described in more detail herein.

Flow apertures 386 may be comparatively small in diameter relative to interior inlet orifice portion 327, thus increasing the pressure at which cooking medium is jetted back into frypot 200. This jetting of cooking medium through flow apertures 386 may have sufficient fluid pressure to cause fluid motion through the cooking medium stored in frypot 200, even when the amount of cooking medium in frypot 200 is great. This fluid motion may collect crumbs and other foreign material from bottom wall 550 and the lower portions of front wall 510, left wall 520, right wall 530, and rear wall 540, and move the foreign material to an area where it may be drained through drain valve assembly 400 and filtered out of the cooking medium. The disposition of left-side, inlet orifice 325 and right-side, inlet orifice 335, as depicted in FIG. 6, is designed to maximize fluid motion through frypot 200. Moreover, in a process that is described in more detail herein, multiport valve 255 controls whether filter pump 245 pumps cooking medium through left-side, inlet orifice 325; right-side, inlet orifice 335; or both at the same time.

Although interior inlet orifice portion 327 and each of flow apertures 386 is depicted as having a round cross-section, in other embodiments of the invention, the cross-section of interior inlet orifice portion 327 and each of flow apertures 386 may be different shapes, e.g., square, rectangular, elliptical, or triangular. Further, although eight flow apertures 386 are depicted formed through a same side of interior inlet orifice portion 327, in other embodiments of the invention, fewer or greater than eight flow apertures 386 may be formed through a same side of interior inlet orifice portion 327 or may be disposed at varying locations of interior inlet orifice portion 327, e.g., spaced equally apart, grouped, or formed through opposing sides.

Figure 12:
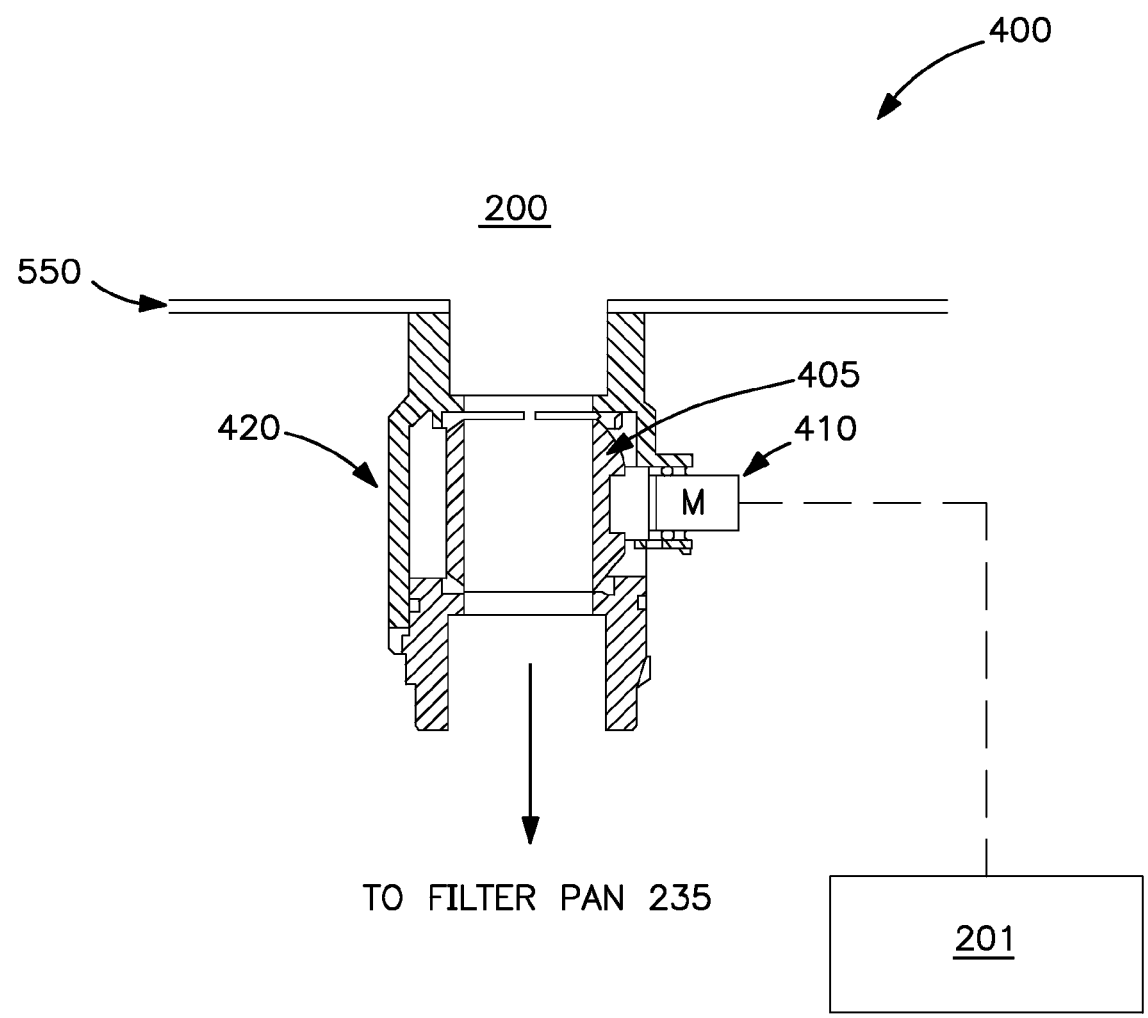
FIG. 12 is a side view of the drain assembly, according to an embodiment of the invention.

FIG. 12 depicts drain valve assembly 400 in more detail, according to an embodiment of the invention. In the depicted embodiment, FIG. 12 depicts a ball-type valve comprising ball valve member 405 and valve wall 420. Drain valve assembly 400 may be controlled to open and shut by an electric actuator 410, which receives signals from controller 201. Electric actuator 410 may cause ball valve member 405 to move, thereby opening and closing the drain valve to allow varying amounts of cooking medium to flow therethrough. Although FIG. 12 depicts a ball-type valve and electric actuator, other types of valves or combinations of valves and actuators that allow for adjustable flow through drain valve assembly 400 may be used. Controller 201 may control the rate of flow of cooking medium from frypot 200 to filter pan 235, in conjunction with the other filter elements, in a process that is described herein.

Figure 13:
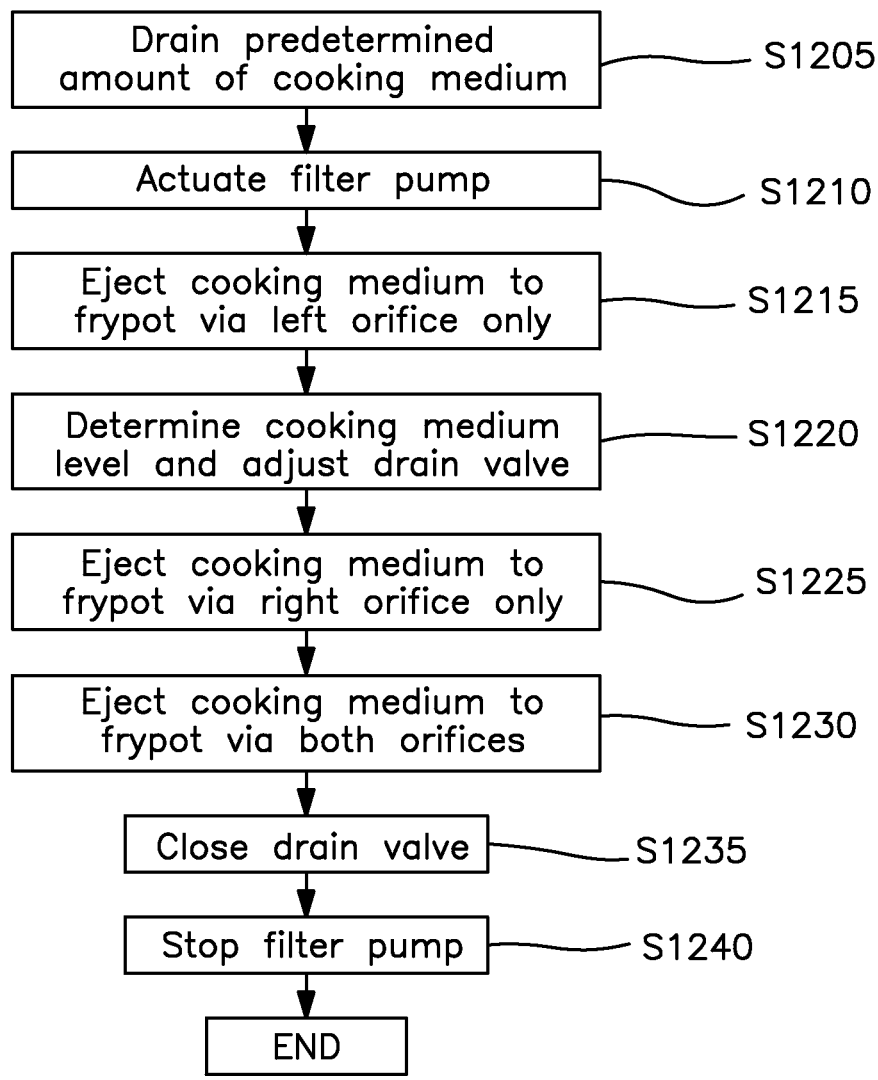
FIG. 13 is a flowchart describing the steps for carrying out the constant level filtration method, according to an embodiment of the invention.

FIG. 13 is a flowchart describing a method of operating the constant level filtering function described above, according to an embodiment of the invention. At S1205, a predetermined amount of cooking medium may be drained from frypot 200 into filter pan 235. In an embodiment of the invention, the predetermined amount of cooking medium may be determined by controller 201 controlling drain valve assembly 400 to open a predetermined amount for a predetermined time period. In another embodiment, however, controller 201 may determine a predetermined amount of cooking medium to drain based on the amount of cooking medium in frypot 200 detected by level sensor 216. For example, if the level of cooking medium in frypot 200 is lower, less cooking medium may be drained from frypot 200 in the initial draining process at step S1205, and the cooking medium may be replenished from a reserve tank of cooking medium (not depicted in the apparatus drawings).

At step S1210, filter pump 245 is actuated. This actuation draws the cooking medium in filter pan 235 to be drawn through a filter element (not shown), which may remove foreign elements and clean the cooking medium. From filter pump 245, the cooking medium may travel to multiport valve 255. Multiport valve 255 may control whether the cooking medium is returned via the left inlet orifice 325 or the right inlet orifice 335, or both. At step S1215, e.g., at the beginning portion of the filtration process, multiport valve 255 may control the cooking medium to return to the frypot via only left inlet orifice valve 325.

As the cooking medium moves from filter pan 235 through multiport valve 255 and left inlet orifice 325, at S1220, controller 201 may read the level of cooking medium in frypot 200 from level sensor 216, and may adjust drain valve assembly 400 to allow cooking medium to flow from frypot 200 into filter pan 235 and back into frypot 200 at a rate which maintains a constant level of cooking medium in frypot 200. This constant level of cooking medium may be predetermined and stored by controller 201 or may be reset based on an average level of cooking medium detected by level sensor 216 during a cooking operation, or may be determined using other methods. Although FIG. 13 depicts a flowchart moving from steps S1220 to S1225 as the method is carried out, controller 201 continues to adjust drain valve assembly 400 to maintain a constant level of cooking medium in frypot 200 until the conclusion of the filtration process.

In an embodiment of the invention, the constant level of cooking medium maintained in frypot 200 by controller 201 during S1220 may be sufficient to carry out a cooking operation, regardless of whether such cooking operation is carried out. In another embodiment of the invention, the constant level of cooking medium is sufficient to maintain the cooking medium at a temperature sufficient to perform a cooking operation. The constant level of cooking medium may vary across embodiments and may be determined by controller 201 at the time of the filtration operation; however, in all embodiments, the system may maintain enough cooking medium in frypot 200 to cover heating element 210, which may be disposed at the bottom of frypot 200. This allows power to be maintained to heating element 210 throughout the filtration process. Thus, heating element 210 may continue to heat the cooking medium throughout the filtration process, thereby causing the cooking medium to lose less of its heat and reducing fryer downtime, as the cooking medium is heated to an appropriate cooking temperature.

As filtration occurs, controller 201 may maintain a constant level in frypot 200, as described at step S1220, and controller 201 may control multiport valve 255 to direct the filtered cooking medium through only the left inlet orifice 325, as described at step S1215. After a predetermined amount of time, controller 201 may send a signal to multiport valve 255 to direct filtered cooking medium only through the right inlet orifice 335, at step S1225. The cooking medium may be directed to be ejected through only one of the inlet orifices in order to increase the pressure of the cooking medium circulating in frypot 200. This allows sufficient fluid flow through frypot 200, even though a majority of the cooking medium may remain in frypot 200. This pressure also allows foreign material to be picked-up, that may collect on the bottom and sides of frypot 200, for ease of collection and disposal through the filtration system. After a further predetermined time, at step S1230, controller 201 controls multiport valve 255 to open both the left inlet orifice 325 and the right inlet orifice 335 at the same time. At this stage in the filtration process, the flow of cooking medium through both orifices may allow further turbulence in the cooking medium stored in frypot 200, thereby further loosening any foreign material that may be lodged on the heating elements or that has settled on the side walls or bottom walls of frypot 200. While the filtration process described above includes directing the filtered cooking medium through only the left inlet orifice 325, at step S1215, before directing the filtered cooking medium only through the right inlet orifice 335, at step S1225; in an alternative embodiment, the order may be reversed, such that the filtered cooking medium is directed only through the right inlet orifice 335 before the filtered cooking medium is directed through only the left inlet orifice 325.

After still another predetermined time period, when controller 201 maintains the cooking medium at a constant level in frypot 200, and the filtered cooking medium is directed through both left inlet orifice 325 and right inlet orifice 335, controller 201 may determine that the cooking medium has been sufficiently filtered. This determination may be based on a fixed amount of time or by an amount of time based on the amount of cooking medium detected by level sensor 216 at the beginning of the process. In another embodiment of the invention, the determination may be based on a measurement of the quality of the cooking medium performed by a quality measuring electrode (not shown) disposed on sensor setting bracket 215. Regardless of the method used, after the still another predetermined time period, at step S1235, controller 201 may cause drain valve assembly 400 to close. After the remaining cooking medium in filter pan 235 is pumped through to frypot 200, controller 201 may stop filter pump 245, at step S1240. Once the filtration process is complete, cooking processes may be resumed immediately, if the cooking medium does not drop below a temperature sufficient for cooking or after the temperature of the cooking medium in frypot 200 reaches a level sufficient for cooking. The temperature of the cooking medium in frypot 200 may reach a level sufficient for cooking only a few seconds after filtration is finished.

Figure 14:
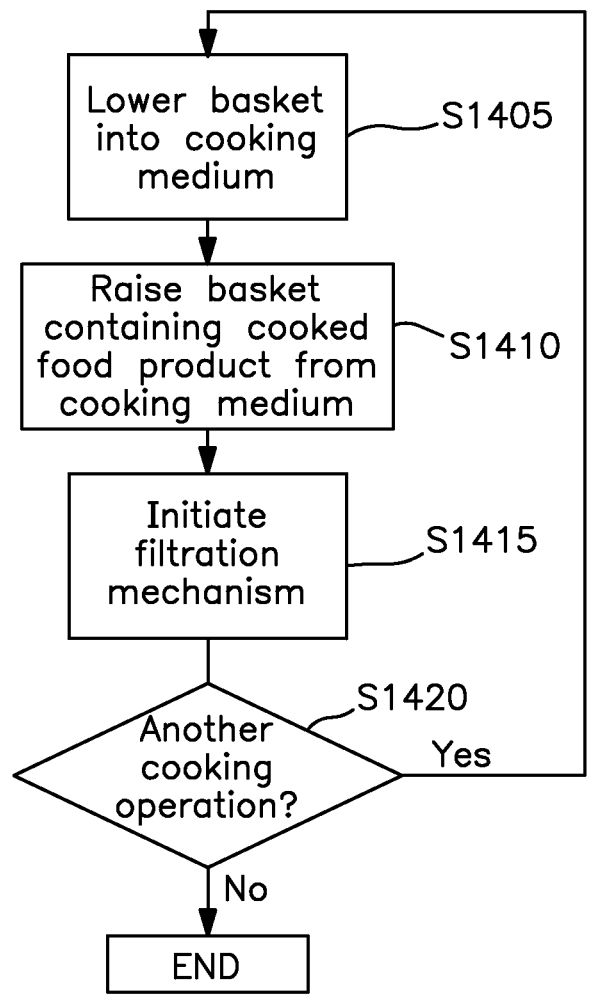
FIG. 14 is a flowchart describing an automated process of fryer apparatus operation, according to an embodiment of the invention.

FIG. 14 depicts a process of automating the cooking and filtration process. At step S1405, a basket of food product (not shown) may be lowered into the cooking medium in frypot 200, which may be at a predetermined cooking temperature. At step S1410, the basket containing cooked food product may be raised from the cooking medium. This step may be initiated by pressing a button or activating a switch (not shown) on fryer apparatus 10. When controller 201 detects that a food cooking operation has been carried out, controller 201 may initiate a filtration operation at step S1415. In an embodiment of the invention, an operator of fryer apparatus 10 may initiate the filtration operation, but in other embodiments of the invention, the filtration process at step S1415 may occur automatically after a cooking operation. At step S1420, a determination may be made regarding whether another cooking operation should occur. If so, the process returns to step S1405 for another cooking operation. If not, the process ends. Thus, in an embodiment of the invention, as described in FIG. 14, a filtration operation may be carried out after each cooking operation, which is made possible by the reduced downtime for maintaining the majority of the cooking medium in frypot 200 during the filtration process.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A fryer apparatus comprising:
 a particular cooking chamber configured to hold cooking medium therein and to cook food products therein;
 at least one heating element disposed in the particular cooking chamber and configured to transmit heat to cooking medium in the particular cooking chamber;
 a filter pan disposed below the particular cooking chamber and configured to receive and filter cooking medium from the particular cooking chamber;
 a drain valve assembly configured to control flow of cooking medium from the particular cooking chamber to the filter pan;
 a filter pump configured to pump filtered cooking medium from the filter pan to the particular cooking chamber;
 a plurality of inlet orifices formed through a bottom wall of the particular cooking chamber and configured to selectively eject filtered cooking medium into the particular cooking chamber;
 a controller configured to control the drain valve assembly to adjust a rate of flow from the particular cooking chamber and to selectively activate a predetermined number of the plurality of inlet orifices of the particular cooking chamber that is less than a total number of the plurality of inlet orifices to eject filtered cooking medium into the particular cooking chamber,
 wherein the controller is configured to:
  control the drain valve assembly and the selective activation of the predetermined number of the plurality of inlet orifices of the particular cooking chamber, and
  maintain a substantially constant level of cooking medium in the particular cooking chamber throughout a filtering operation.

2. The fryer apparatus of claim 1, wherein the substantially constant level of cooking medium covers the at least one heating element, and wherein the heating element is an electric heating element and power is supplied to the at least one heating element throughout the filtering operation.

3. The fryer apparatus of claim 1, further comprising:
 a level sensor configured to determine an amount of cooking medium in the particular cooking chamber and to transmit data related to the amount of cooking medium to the controller, wherein the controller controls the drain valve assembly to drain cooking medium from the cooking chamber at a rate which maintains the substantially constant level of cooking medium in the particular cooking chamber based on the data received from the level sensor.

4. The fryer apparatus of claim 3, further comprising:
 a sensor setting block mounted to a wall of the particular cooking chamber, wherein the level sensor is disposed on the sensor setting block.

5. The fryer apparatus of claim 1, further comprising:
 a multiport valve connected to each of the plurality of inlet orifices of the particular cooking chamber and to the filter pan, wherein the controller controls the multiport valve selectively to open and close each of the plurality of inlet orifices.

6. A fryer apparatus comprising:
 a particular cooking chamber configured to hold cooking medium therein and to cook food products therein;
 at least one heating element disposed in the particular cooking chamber and configured to transmit heat to cooking medium in the particular cooking chamber;
 a filter pan disposed below the particular cooking chamber and configured to receive and filter cooking medium from the particular cooking chamber;
 a drain valve assembly configured to control flow of cooking medium from the particular cooking chamber to the filter pan;
 a filter pump configured to pump filtered cooking medium from the filter pan to the particular cooking chamber;
 a plurality of inlet orifices formed through a bottom wall of the particular cooking chamber and configured to selectively eject filtered cooking medium into the particular cooking chamber;
 a controller configured to control the drain valve assembly to adjust a rate of flow from the particular cooking chamber and to selectively activate at least one inlet orifice of the plurality of inlet orifices of the particular cooking chamber to eject filtered cooking medium into the particular cooking chamber,
 wherein the controller is configured to:
  control the drain valve assembly and the selective activation of the at least one inlet orifice, and
  maintain a substantially constant level of cooking medium in the cooking chamber throughout a filtering operation,
 wherein each of the plurality of inlet orifices of the particular cooking chamber further comprises:

an exterior inlet orifice portion; and
an interior inlet orifice portion removably attached to the exterior inlet orifice portion and at least a portion of the interior inlet orifice portion being configured to extend from the bottom wall of the particular cooking chamber so as to project into the cooking chamber.

7. The fryer apparatus of claim 6, wherein the exterior inlet orifice portion is formed integrally with the particular cooking chamber.

8. The fryer apparatus of claim 6, wherein the interior inlet orifice portion is removably attached to the particular cooking chamber.

9. The fryer apparatus of claim 6, wherein each interior inlet orifice portion comprises:
a hollow cap portion that extends outward into the particular cooking chamber when fixed to the cooking chamber; and
at least one flow aperture formed through a sidewall of the hollow cap portion, wherein each of the at least one flow apertures has a cross-sectional area less than that of the interior inlet orifice portion, and wherein when cooking medium is ejected through the interior inlet orifice portion, the cooking medium is ejected through the at least one flow aperture of the interior inlet orifice portion, to increase a velocity of the ejected cooking medium into the particular cooking chamber.

10. The fryer apparatus of claim 9, wherein each interior inlet orifice portion has a substantially round cross-section.

11. The fryer apparatus of claim 10, wherein the at least one flow aperture has a substantially round cross-section, such that each of the at least one flow apertures has a diameter less than that of the interior inlet orifice portion.

12. The fryer apparatus of claim 9, wherein the at least one flow aperture comprises eight flow apertures.

13. The fryer apparatus of claim 12, wherein each of the eight flow apertures is formed through a same side of each of the plurality of inlet orifices of the particular cooking chamber.

14. The fryer apparatus of claim 1, wherein the plurality of inlet orifices of the particular cooking chamber comprises a first inlet orifice and a second inlet orifice which are formed through the bottom wall of the particular cooking chamber and disposed at opposite corners of the bottom wall of the cooking chamber.

15. The fryer apparatus of claim 1, wherein the particular cooking chamber comprises:
a front wall;
a back wall opposite the front wall;
a left wall;
a right wall opposite the left wall, wherein the left and right walls extend between the front and back walls; and
the bottom wall disposed at the bottom of the particular cooking chamber and connecting the front wall, back wall, left wall, and right wall,
and wherein the plurality of inlet orifices of the particular cooking chamber comprises:
a first inlet orifice formed through the bottom wall and disposed closer to the front wall and the left wall than the back wall and the right wall; and
a second inlet orifice formed through the bottom wall and disposed closer to the back wall and the right wall than the front wall and the left wall.

16. The fryer apparatus of claim 1, wherein the drain valve assembly further comprises:
a ball valve configured to open selectively and close selectively the drain valve assembly; and
an electronic actuator configured to control the ball valve, wherein the controller is configured to activate selectively the electronic actuator.

17. A method of filtering cooking medium contained in a single cooking chamber of a fryer apparatus having at least one heating element therein, the method comprising:
draining a predetermined amount of cooking medium from the single cooking chamber, such that each of the at least one heating element is submerged in cooking medium through the entire method;
filtering cooking medium that has been drained;
ejecting cooking medium that has been filtered back to the single cooking chamber through a predetermined number of a plurality of inlet orifices of the single cooking chamber that is less than a total number of the plurality of inlet orifices;
further draining cooking medium from the single cooking chamber while further ejecting filtered cooking medium through the predetermined number of the plurality of inlet orifices of the single chamber; and
controlling a rate of further draining and a rate of further ejecting, such that a substantially constant level of cooking medium is maintained in the single cooking chamber throughout a filtering operation.

18. The method of claim 17, wherein the controlling the rate of further draining comprises adjusting the rate of further draining by adjusting a size of a drain valve opening through which cooking medium is drained.

19. The method of claim 17, wherein the ejecting cooking medium comprises:
ejecting cooking medium that has been filtered through only a first orifice of the single cooking chamber for a predetermined period of time;
ejecting cooking medium that has been filtered through only a second orifice of the single cooking chamber for a predetermined period of time; and
ejecting cooking medium that has been filtered through both the first orifice and the second orifice of the single cooking chamber for a predetermined period of time.

20. The method of claim 19, wherein cooking medium is first ejected through only the first orifice, then ejected through only the second orifice, and then ejected through both the first orifice and the second orifice.

* * * * *